United States Patent Office 3,179,602
Patented Apr. 20, 1965

3,179,602
PREPARATION OF A CHROMIA-ALUMINA HYDROCARBON CONVERSION CATALYST
Alcuin F. Gremillion, Kirkwood, Mo., assignor to Monsanto Company, a corporation of Delaware
No Drawing. Filed Sept. 6, 1961, Ser. No. 136,187
2 Claims. (Cl. 252—465)

The present invention relates to the catalytic conversion of hydrocarbons. More particularly, the present invention relates to a specifically prepared chromia-alumina catalyst and to a process for the dehydrocyclization of paraffin hydrocarbons in the presence of this catalyst.

Chromia-alumina catalysts are well known in the dehydrocyclization of paraffin hydrocarbons as well as in other hydrocarbon conversion reactions. It is also known that variations in composition, technique of preparation, etc., of these as well as most other catalysts will in many instances cause significant changes in the activity of the catalysts, thereby changing yields, catalyst life, etc. Therefore, the discovery of new compositions and techniques of preparation is highly significant in the advancement of the catalytic art.

It is an object of this invention to provide an improved chromia-alumina catalyst. It is also an object of the present invention to provide an improved process for the dehydrocyclization of paraffin hydrocarbons to aromatic hydrocarbons. A more particular object of the present invention is to provide an improved chromia-alumina catalyst having particular utility in the dehydrocyclization of paraffin hydrocarbons. Another particular object of the present invention is to provide a method for the preparation of an improved chromia-alumina catalyst. A specific object of the present invention is to provide a process for the catalytic dehydrocyclization of paraffin hydrocarbons to aromatic hydrocarbons wherein the catalyst is a specifically prepared chromia-alumina catalyst. Additional objects will become apparent from the following description of the invention herein disclosed.

In fulfillment of these and other objects, it has been found that a significantly improved chromia-alumina catalyst can be prepared by impregnating an alumina with a solution of an oxide of chromium, drying the impregnated alumina and thereafter calcining the alumina by placing the alumina under relatively high vacuum and heating to a temperature of 450 to 600° C. and then cooling back to room temperature while still under vacuum. On completion of the calcining, the catalyst is then reduced in a hydrogen atmosphere at a temperature of 400 to 550° C. The catalyst thus prepared is then preferably allowed to age several days before using. The novel catalyst of this invention exhibits exceptional utility for the dehydrocyclization of paraffin hydrocarbons to aromatic hydrocarbons. Accordingly, this invention provides a process for the dehydrocyclization of paraffin hydrocarbons to aromatic hydrocarbons which comprises contacting paraffin hydrocarbons of at least 6 carbon atoms with a chromia-alumina catalyst at a temperature of 500 to 600° C. and at a space velocity of 0.05 to 2.0 volumes of liquid feed per hour per volume of catalyst and at a pressure of atmospheric to 100 p.s.i.g., said chromia-alumina catalyst being one prepared by impregnating an alumina support with a solution of an oxide of chromium, drying the impregnated support, thereafter calcining the dried support by placing the impregnated alumina under relatively high vacuum and heating to 450 to 600° C. and then cooling back to room temperature while still under vacuum, and then reducing the vacuum-calcined catalyst in a hydrogen atmosphere at a temperature of 400 to 550° C.

As a comparative illustration of this invention, chromia-alumina catalysts were prepared by conventional means and according to the present invention. These were prepared as follows:

A Bayer process alumina of 120 square meters per gram surface area and an average pore diameter size of 160 angstroms was totally immersed in an aqueous solution of $CrO_3$. The excess solution was then filtered off and the catalyst dried at 120 to 130° C. for five hours. Next, the catalyst was calcined in air for 15 hours at 550° C. at atmospheric pressure. The calcined catalyst was then reduced in a hydrogen atmosphere at 500° C. for one hour. The catalyst produced contained 10 percent by weight $Cr_2O_3$.

A second catalyst, prepared according to the present invention, was prepared as that above with the exception that calcining was carried out by placing the dried catalyst at room temperature under a vacuum of $10^{-3}$ to $10^{-4}$ mm. Hg and then heating to a temperature of 500° C. while maintaining the vacuum in the above range. The catalyst was then cooled back to room temperature while still under the vacuum. This catalyst was 10 weight percent $Cr_2O_3$.

Dehydrocyclization reactors were charged with each of these catalysts and n-hexane passed through the catalyst beds under the conditions set forth and with the results shown in the following Table I. The conventional catalyst is denoted as Catalyst A and the catalyst of this invention as Catalyst B.

*Table I*

| Conditions | Catalyst A | Catalyst B |
|---|---|---|
| Temperature, ° C | 540 | 540 |
| Pressure, p.s.i.g | Atmospheric | Atmospheric |
| Space velocity, liq. vols. n-$C_6$/hr./vol. cat | 0.5 | 0.5 |
| Yields of Benzene (Wt. Percent): | | |
| Based on n-hexane charged | 28.3 | 29.4 |
| Based on n-hexane consumed | 35.6 | 39.6 |

The above runs were made with catalysts which had been allowed to stand under identical normal storage conditions for 36 hours. Other runs were made using these catalysts after additional storage periods. The operating conditions for these runs were the same as above. In all cases the yield of benzene using conventional Catalyst A were the same as above. However, the yields of Catalyst B prepared in accordance with the present invention increased after the additional storage periods. The following Table II presents the yields of benzene obtained from n-hexane after Catalyst B had been stored for the various periods.

*Table II*

| Storage Period, Hrs. | Yields Based on N-Hexane | |
|---|---|---|
| | Charged | Consumed |
| 48 | 30.0 | 42.8 |
| 60 | 33.0 | 46.3 |
| 144 | 34.0 | 44.4 |

It is apparent from Table II that it is preferable to use the catalyst disclosed herein after it has "aged" under normal storage conditions for several days. It is to be noted, however, that the catalyst of the present invention shows significant superiority over the conventional chromia-alumina catalyst when used immediately after preparation. Therefore, while it is desirable to await "aging" of the catalyst of the present invention, advantages in yields of aromatics may be obtained when using it without allowing several days of storage.

Though the present invention is primarily directed toward chromia-alumina catalysts, it is not so limited. Chromia-alumina catalysts containing up to 5 percent by weight of one or more catalyst promoters may be prepared in accordance with the present invention. When such promoted chromia-alumina catalysts are prepared by the method of the present invention, it is generally preferred to use the vacuum calcination technique after the catalyst has been completely impregnated and dried.

The chromia-alumina catalysts of the present invention may contain from 5 to 50 percent by weight of chromia and 50 to 90 percent by weight of alumina. It is somewhat more preferred to have a catalyst consisting of 8 to 14 weight percent of chromia with the remainder being alumina. The optimum composition of the chromia-alumina catalyst will, of course, vary somewhat with the reaction to be catalyzed. The above ranges will generally suffice, however, regardless of utility. If a catalyst promoter is added as mentioned in the preceding paragraph, the amount of $CR_2O_3$ and $Al_2O_3$ present in the catalyst will be within the weight ratios created by the above weight limitations.

The alumina base support may be of any type. It is, however, preferred that it be alumina of 50 to 400 square meters per gram surface area and average pore diameters of 40 to 320 angstroms and higher. Still more preferred are the Bayer process gamma-aluminas of 100 to 150 square meters per gram surface area and average pore diameters of 50 to 240 angstroms.

The catalyst promoters which may be used with the chromia-alumina compositions disclosed herein are any of those known to the art for promoting chromia-alumina catalysts. Those include the oxides of such metals as the alkali metals, copper, zinc, molybdenum, iron, titanium, vanadium, cobalt, manganese, antimony, zirconium, nickel, platinum, palladium, silver, tungsten, cerium, cesium, etc. The choice of a promoter will depend largely upon the future utilization of the novel catalyst disclosed herein. If it is to be used for dehydrocyclization, the promoters which are somewhat preferred are the alkali metals, e.g., potassium, sodium, rubidium, lithium, and such other metals as tin, antimony, molybdenum and cerium.

The method of preparation of the catalysts herein disclosed follows conventional known methods with the exception of the calcination step. The chromium may be placed on the alumina by impregnation, co-gelation, co-precipitation, precipitation, etc. In the method preferred, the alumina support is usually calcined by conventional methods at about 700° C. It is then cooled and thoroughly wetted with a solution containing the active component which is added as $CrO_3$. The catalyst is then filtered from the solution and dried for several hours, e.g., 3 to 24, at temperatures of 100 to 150° C. This is followed by the most critical step in the catalyst preparation, the calcination step which is adequately described elsewhere herein. Calcination is followed by reduction in a hydrogen atmosphere at temperatures of 400 to 550° C. The catalyst is then ready for use. If a promoter is to be used on the chromia-alumina catalyst, it may be placed on the catalyst in the same manner as the chromium.

The critical calcination step of the catalyst preparation technique disclosed herein is briefly described as a vacuum calcination. This comprises placing the dried impregnated catalyst in a vessel capable of withstanding high vacuum. The catalyst at this point is at approximately room temperature. The vessel is then evacuated to a pressure within the range of $10^{-1}$ to $10^{-5}$ mm. Hg but somewhat more preferably $10^{-3}$ to $10^{-4}$ mm. Hg. While maintaining the vacuum within these ranges, the catalyst is heated to a temperature of 450 to 600° C. Temperatures above 600° C. should be avoided since there is considerable danger of catalyst sintering above this temperature. The time necessary for heating from room temperature to the 450 to 600° C. mark is limited only by the rapidity at which heat can be applied without upsetting the pressure. On reaching a temperature within this range the heat source is removed and the catalyst allowed to cool back to room temperature. When the catalyst has sufficiently cooled the pressure of the vessel is returned to atmospheric pressure. The catalyst is then ready for reduction, which is by conventional means.

As previously mentioned, the catalyst disclosed herein becomes more active on storage until an apparent maximum is reached. The present catalyst appears to reach a maximum in activity between 48 and 144 hours of storage. Storage as referred to herein, is by inclosure of the catalyst in a tightly sealed container. It is not presently known why storage under such conditions improves the activity of the present catalyst.

While the novel catalyst and method of preparation disclosed herein are particularly effective for the dehydrocyclization of paraffin hydrocarbons to aromatic hydrocarbons, they also may be utilized for dehydrogenation, dealkylation, hydrodealkylation, etc.

In the dehydrocyclization of paraffin hydrocarbons according to the process of the present invention, it is necessary to maintain the temperature in the reaction zone within certain temperature limits. The temperature may be in the range of 500 to 600° C. but more preferably in the range of 535 to 575° C. The optimum yield temperature is very closely related to space velocity. As the space velocity is increased, the optimum yield temperature will also increase. The space velocity may range from 0.5 to 2.0 liquid volumes of feed per hour per volume of catalyst. A somewhat more preferred space velocity, however, is within the range 0.25 to 1.5 liquid volumes of feed per hour per volume of catalyst.

The pressures at which the dehydrocyclization process may be operated may range from sub-atmospheric to 100 or more p.s.i.g. It is preferred to operate the process at approximately atmospheric pressure or slightly above, e.g., 5 to 10 p.s.i.g.

The preferred feedstocks anticipated for dehydrocyclization with the catalyst described herein are those containing an approximate minimum of 90 mol percent paraffin hydrocarbons and a naphthene maximum of 5 mol percent. However, the invention will operate with lower paraffin and/or higher naphthene content but the efficiency of the reaction is somewhat impaired as the composition is deviated beyond these limits. A low naphthene content is desirable because of the carbon forming tendency of the naphthenes under the relatively severe operating conditions necessary for the dehydrocyclization of paraffin hydrocarbons. The lower the naphthene content, the longer the time period dehydrocyclization may take place without the necessity of a shutdown for regeneration. The paraffin hydrocarbons which may be used in the practice of this invention contain at least six carbon atoms and preferably six to twelve carbon atoms. It is preferred that the paraffin hydrocarbons be straight-chain. These include n-hexane, n-heptane, n-octane, n-nonane, n-decane, n-undecane and n-dodecane. The less preferred branched chain paraffin hydrocarbons contain 6 to 12 carbon atoms in the straight-chain and preferably have only slight branching. Several non-limiting examples of such branched chain paraffin hydrocarbons are the methylhexanes, methylheptanes, dimethylhexanes, dimethylheptanes, ethylheptane, etc.

When it becomes necessary to regenerate the catalyst due to carbon deposition, practically any conventional method of carbon removal may be used. The thermal stability limits of the catalyst will, of course, limit some potential regeneration techniques. The maximum catalyst temperature limit is 700° C. Preferably, however, the catalyst should not be heated higher than 600° C. A logical inexpensive carbon removal system is air oxidation. Any of several methods may be used for controlling the temperature during the extremely exothermic regeneration. Among these are the limitation of regeneration gas flow rates, oxygen content of regeneration gases, use of heat absorbing mediums, high velocity air flow, etc.

The method of contacting the catalyst with the feed may involve either adiabatic or isothermal operations in a conventional fixed, moving or fluidized bed. The fluidized bed may be of the single vessel or multi-vessel circulating type. Those skilled in the art will see that a wide variety of mechanical designs of each of these types may serve to carry out the desired aromatic production.

What is claimed is:

1. A method of preparing a chromina-alumina catalyst consisting of impregnating an alumina support with a solution of $CrO_3$, drying the impregnated alumina and calcining the dried catalyst by heating from room temperature to 450 to 600° C. while maintaining said catalyst at a reduced pressure of $10^{-1}$ to $10^{-5}$ mm. Hg, and then cooling said catalyst back to room temperature while still maintaining said catalyst at said reduced pressure of $10^{-1}$ to $10^{-5}$ mm. Hg, and thereafter reducing the calcined catalyst in a hydrogen atmosphere.

2. The method of claim 1 wherein calcination is carried out at a pressure of $10^{-3}$ to $10^{-4}$ mm. Hg.

References Cited by the Examiner
UNITED STATES PATENTS

| | | | |
|---|---|---|---|
| 2,184,235 | 12/39 | Groll et al. | 208—136 |
| 2,217,865 | 10/40 | Groll et al. | 252—465 |
| 2,236,514 | 4/41 | Burk et al. | 252—465 |
| 2,270,165 | 1/42 | Groll et al. | 252—465 |
| 2,337,191 | 12/43 | Greensfelder et al. | 252—465 |
| 2,412,600 | 12/46 | Burk et al. | 252—465 |
| 3,076,046 | 1/63 | Estes et al. | 260—673.5 |

ALPHONSO D. SULLIVAN, *Primary Examiner.*